United States Patent [19]

Sakata et al.

[11] Patent Number: 4,583,996
[45] Date of Patent: Apr. 22, 1986

[54] APPARATUS FOR SEPARATING CONDENSABLE GAS

[75] Inventors: Jiro Sakata; Minoru Yamamoto, both of Aichi, Japan

[73] Assignee: Kabushiki Kaisha Toyota Chuo Kenkyusho, Aichi, Japan

[21] Appl. No.: 667,745

[22] Filed: Nov. 2, 1984

[30] Foreign Application Priority Data

Nov. 4, 1983 [JP] Japan .................. 58-207112

[51] Int. Cl.4 ............................ B01D 53/22
[52] U.S. Cl. .......................... 55/16; 55/158; 65/31; 264/167
[58] Field of Search ............ 55/16, 158; 65/3.15, 65/31; 264/167; 428/366, 398

[56] References Cited

U.S. PATENT DOCUMENTS

| | | | |
|---|---|---|---|
| 2,303,756 | 12/1942 | Nordberg et al. | 65/33 |
| 2,433,741 | 12/1947 | Crawford | 55/16 |
| 3,262,767 | 7/1966 | Wang | 65/3.15 X |
| 3,294,504 | 12/1966 | Hicks, Jr. | 55/16 X |
| 3,511,031 | 5/1970 | Ketteringham et al. | 55/16 X |
| 3,523,568 | 8/1970 | van Leeuwen | 55/16 X |
| 3,650,721 | 3/1972 | Hammel et al. | 65/3.15 X |
| 3,735,558 | 5/1973 | Skarstrom et al. | 55/16 |
| 4,175,153 | 11/1979 | Dobo et al. | 55/16 X |
| 4,293,376 | 10/1981 | Weingand | 65/31 X |
| 4,349,356 | 9/1982 | Wakao | 55/16 |
| 4,482,360 | 11/1984 | Taketomo et al. | 55/16 |
| 4,504,285 | 3/1985 | Modisette | 55/16 |

FOREIGN PATENT DOCUMENTS

| | | | |
|---|---|---|---|
| 145343 | 12/1978 | Japan | 55/16 |
| 119420 | 9/1980 | Japan | 55/16 |

Primary Examiner—Robert Spitzer
Attorney, Agent, or Firm—Parkhurst & Oliff

[57] ABSTRACT

This invention provides an apparatus for separating condensable gas, which is provided with, as a membrane for separating condensable gas, an inorganic porous membrane which has a layer having a multiplicity of micropores communicating in the thickness direction of the membrane and having a pore radius, as determined by the nitrogen absorption method, of up to 50 Å, and preferably up to 20 Å, and which has an affinity for said condensable gas or is hydrophilic. This apparatus yields highly selective permeation of condensable gas, such as water vapor or organic gases.

19 Claims, 5 Drawing Figures (a) EXAMPLE 1  (b) EXAMPLE 2  (c) EXAMPLE 3
(d) EXAMPLE 4  (e) EXAMPLE 5  (f) EXAMPLE 6
(g) EXAMPLE 7  (h) EXAMPLE 8  (i) COMPARATIVE EXAMPLE 1
(j) COMPARATIVE EXAMPLE 2  (k) COMPARATIVE EXAMPLE 3
(ℓ) COMPARATIVE EXAMPLE 4

(a) EXAMPLE 1  (b) EXAMPLE 2  (c) EXAMPLE 3
(d) EXAMPLE 4  (e) EXAMPLE 5  (f) EXAMPLE 6
(g) COMPARATIVE EXAMPLE 2    (h) COMPARATIVE EXAMPLE 3
(i) COMPARATIVE EXAMPLE 1

APPARATUS FOR SEPARATING CONDENSABLE GAS

BACKGROUND OF THE INVENTION

1. Field of the Invention

This invention relates to an apparatus for separating condensable gas, especially water vapor from a gas mixture containing condensable gas, by using an inorganic porous membrane, preferably an inorganic porous hydrophilic membrane, and to a process for such separation.

2. Description of the Prior Art

The degree of sultriness which the human body experiences is influenced not only by high temperature but also by high humidity. Accordingly, there is a large demand for dehumidifiers since people feel more comfortable when humidity is low. Also, since water is an active molecule, the removal of water is indispensible for the storage of drugs and other chemicals. From a hygienic viewpoint, dehumidification is necessary because the multiplication of microorganisms such as molds is more active at high humidity. Further, humidity control is practiced in a wide variety of fields including the electric industry, precision machine industry, and textile industry.

Presently, there are three practical methods for removing water vapor. The first method involves bringing gas into contact with a hygroscopic agent, such as a silica gel, a molecular sieve, quick lime, calcium chloride, phosphorus pentoxide, lithium chloride, or concentrated sulfuric acid, to remove moisture contained in a gas. In this method, it is necessary to dispose or regenerate the used hygroscopic agent and, therefore, continuous operation is impossible when only one dehumidifier is used.

The second method involves condensing moisture contained in a gas by compressing or cooling the gas to thereby remove the moisture. This method has an advantage in that continuous operation and mass treatment are possible, but has disadvantages in that it requires a large quantity of energy and that dehumidification to low humidity is difficult.

The third method is one which has been recently developed and it involves removing water vapor from a gas by using a membrane having selective permeability to water vapor. This method includes two processes, i.e., one in which a homogeneous membrane is used and one in which a porous membrane carries a hygroscopic agent. Both of these processes have an advantage in that continuous operation is possible.

The process in which a homogeneous membrane is used provides a high separation ratio but has a disadvantage in that the permeation rate is low. When the permeation rate is low, the quantity of vapor permeated can be increased by increasing the difference in partial pressure between both surfaces of the membrane, which serves as a driving force for permeation through the membrane. However, this has been difficult because the saturated vapor pressure of water is as low as about 20 mmHg at room temperature. In reality, when a method in which the separation of water vapor is carried out by using a thin polymer film having a very high permeability to water vapor is considered, such as in Japanese Patent Laid-Open No. 152679/1979, the water vapor permeation rate is $5.6 \times 10^{-6}$ g/cm$^2$.sec.cmHg for a film thickness of 5 μm, and even when a hollow fiber with a membrane area of as large as 4.7 m$^2$ is used, the throughput is as low as 100 l/min and the dehumidification rate is as low as 79%.

The process in which a porous membrane carries an adsorbent is one involving the use of a membrane formed by impregnating a porous support, for example, paper, cloth, or nonwoven fabric, with a hygroscopic polymer, for example, polyvinyl alcohol or polyethylene glycol, and/or a hygroscopic agent, for example, lithium chloride; see for example, Japanese Patent Laid-Open Nos. 2277/1979, 114481/1979, and 119421/1980. This process can provide a high permeation rate but has a disadvantage in that the membrane contains a hygroscopic polymer or agent which absorbs water when the membrane is used or left standing under a high humidity condition so that the formed solution exudes from the membrane to lower the performance of the membrane. In the membrane separation method, it is most suitable to increase the difference in partial pressure of water vapor between both surfaces of the membrane by reducing the pressure on the effluent side, but this is thought to be impossible because the membrane does not have sufficient pressure resistance. In fact, in the above-mentioned process, the reduction in pressure is not realized and the moisture is simply exchanged between a gas mixture and dry gas. A system which is carried out by using dry gas can not provide good efficiency because dehumidification of a gas mixture of 100% relative humidity to below 10% relative humidity requires dry gas of 0% humidity in an amount of about 10 times that of the gas to be dehumidified assuming the moisture exchange is perfect.

In some methods of separating a gas, such as hydrogen or helium, a porous membrane is used. If selective permeation to water vapor can be performed by using a porous membrane only, it is thought possible to obtain a water vapor separation apparatus which has a simple structure and sufficient stability and durability because the permeation rate is high and no adsorbent is used. In general, however, gas separation by a porous membrane utilizes Knudsen flow, which is a phenomenon by which the permeation rate of a gas is inversely proportional to the square foot of its molecular weight. Therefore, though this method is effective for the separation of hydrogen, it is ineffective for separating water vapor from air, for example, since the separation ratio becomes as low as about 1.26 due to the close molecular weights of air and water. Thus the practicality is low, and there has been no actual example of water vapor separation by a porous membrane. Actually, as the following Comparative Example 1 demonstrates, air having a 62% relative humidity is dehumidified to only about 50% relative humidity in a system in which the separation is performed by Knudsen flow, and the recovery rate is as low as 16%, which is not practical.

SUMMARY OF THE INVENTION

It is therefore an object of this invention to provide an apparatus for separating a condensable gas, especially water vapor, equipped with a porous membrane which is improved in previously unsatisfactory selective permeability to a condensable gas such as water vapor.

As a result of an extensive study on a variety of porous membranes, it has been found that highly selective permeation to a condensable gas can be attained when an inorganic porous membrane which has a pore radius of up to 50 Å, and preferably up to 20 Å, and which has an affinity for the condensable gas and is preferably hydrophilic is used as a separation membrane. In this specification, an inorganic porous membrane having an affinity for the condensable gas is defined as one having high adsorptive activity to the condensable gas or one having the critical surface tension larger than the surface tension of the condensed gas (e.g. one being hydrophilic).

More particularly, this invention relates to apparatus and a process for separating condensable gas by contacting a first surface of a membrane with a gas mixture containing a condensable gas, such as water vapor or an organic gas, and either contacting a second surface of the membrane with a gas having a concentration of the condensable gas lower than that at the first surface or reducing the pressure on the second surface. The apparatus is provided with an inorganic porous membrane having a multiplicity of micropores communicating in the thickness direction of the membrane and having a pore radius, as determined by the nitrogen adsorption method, of up to 50 Å, and preferably up to 20 Å, and which has an affinity for the condensable gas or is hydrophilic.

DETAILED DESCRIPTION OF THE INVENTION

Figure 1:
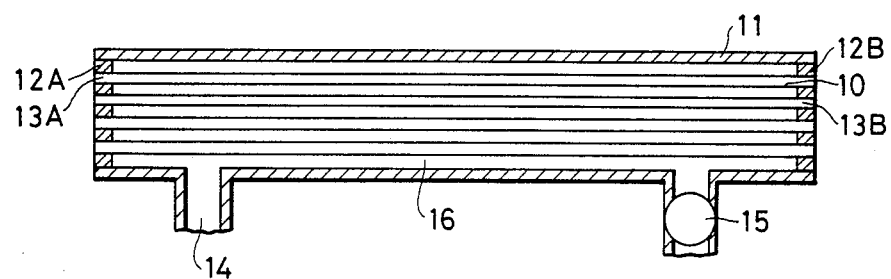
FIG. 1 is a schematic longitudinal cross-sectional view of apparatus for separating water vapor according to the present invention.
Figure 2:
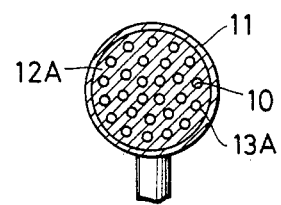
FIG. 2 is a left side view of the apparatus of FIG. 1.

The above-mentioned condensable gas refers to at least one inorganic or organic gas which is soluble in water at temperatures and pressures used in the separation apparatus of the present invention or can be condensed at these temperatures and pressures. The temperature and pressure used in the separation apparatus of the present invention is usually room temperature and atmospheric pressure. Examples of these inorganic and organic gases are: (A) inorganic gases such as water vapor, carbon dioxide, hydrogen sulfide, and ammonia; (B) organic gases such as carboxylic acids including acetic acid, propionic acid, butyric acid, valeric acid, and derivatives thereof; amines including ethylamine, propylamine, morpholine, and derivatives thereof; hydrocarbons including benzene, toluene, hexane and derivatives thereof; aldehydes including formaldehyde and acetaldehyde; alcohols including phenol, ethanol, and methanol; and mixtures thereof.

The apparatus of the present invention is especially suitable for the separation of water vapor. Although the principle by which water vapor selectively permeates a hydrophilic inorganic porous membrane having micropores is not clear, it is thought to result from two phenomena known as diffusion of adsorbed water and capillary condensation.

Diffusion of adsorbed water is a phenomenon by which water adsorbed in a thickness of a membrane which corresponds to the partial pressure of water, diffuses along the surface of micropores in the membrane due to the difference of partial pressure between the surfaces of the membrane.

Capillary condensation is a phenomenon in which, when the condensable gas is, for example, water vapor and when a micropore r in a porous membrane, having a certain pore radius is greater than a Kelvin radius $r_k$ as defined by the following equation (1):

$$r_k = \frac{-2\gamma M \cos \cdot \theta}{\rho RT \ln(P/P_s)} \quad (1)$$

wherein $r_k$ is a Kelvin radius, $\gamma$ is the surface tension of water, M is the molecular weight of water, $\theta$ is an angle of contact, $\rho$ is the density of water, R is the gas constant, T is an absolute temperature, and $P/P_s$ is relative humidity, only a layer of water adsorbed according to the relative humidity is formed and leaves the micropore open, but when the radius of the micropore is smaller than $r_k$, the water condenses in the interior of the micropore and blocks it. In this way, the porous membrane is brought to a liquid membrane state and the liquid membrane permits passing of water vapor but not other gases. Therefore, it is possible to obtain a water-selective permeation membrane having a high separating power. It can be understood from equation (1) that in order to effect capillary condensation at 60% relative humidity or above at room temperature, a porous membrane having extremely small pores of a radius of up to about 22 Å is necessary. However, the situation can not be understood completely by such a simple principle. As described in examples below, a membrane having a pore radius of 12 Å as measured by the nitrogen adsorption method, which is a membrane having the minimum relative humidity at which capillary condensation takes place of 41% as determined from equation (1), actually shows a high dehumidification capacity including a minimum attainable humidity of 5.4% and a recovery rate of above 90% at a dehumidification rate of 60%. Therefore, it is presumed that this phenomenon does not arise from simple capillary condensation and that gel-like matter present within the micropores expands by moisture absorption to reduce the apparent pore size as compared with the actual size, or that the phenomenon is somewhat due to the diffusion of adsorbed water.

Although the above description refers to the situation where the condensable gas is water vapor, the above equation (1) can be held constant by varying the value of P in the partial pressure $P/P_o$, in relation to the same Kelvin radius $r_k$ by varying other parameters such as, M (molecular weight), $\rho$ (density), and $\gamma$ (surface tension) to subject other substances to capillary condensation. Namely, since only the minimum concentration at which capillary condensation takes place changes, all of the condensable gases can be separated by the apparatus of this invention.

The hydrophilic porous membranes which can be used in the present invention include porous membranes of glass having a composition such that, when heat-treated, it separates into a soft phase which leaches in an acid solution and a hard phase which does not leach in the acid solution. For example, porous membranes of sodium borosilicate glass, potassium borosilicate glass or soda glass of this composition, and membranes of other inorganic porous substances having affinity for water, such as porous membranes of glass sinter, aluminum sinter, or hydrolyzates of metal alkoxides, among which a porous membrane of sodium borosilicate glass is preferable, may be used.

The pore radius of the inorganic porous membrane of the present invention is at most 50 Å and is preferably from 2 Å up to 20 Å. It is not necessary, however, that all of the micropores in the entire membrane have the above-specified radius but it is necessary that the micropores are distributed in such a manner that substantially all of the condensable gas may pass through micropores of a radius of less than or equal to 50 Å when the gas passes from one surface of the membrane to the other. For example, such micropores may be distributed in a layer. The thickness of this layer is preferably at least 2 Å, and is particularly at least 50 Å. Further, this layer may be in the form of a flat or curved surface. For example, an anisotropic porous membrane having a layer with a pore radius of less than 20 Å up to a depth of 0.1 μm from one surface, with the remaining portion having micropores of a pore radius of at least 20 Å, communicating in the thickness direction of the membrane may be used. When the micropores communicate only in the thickness direction and these micropores do not cross each other, it is sufficient that a portion of each micropore has a pore radius of up to 50 Å. In this case, it is preferable that the portion having a pore radius of up to 50 Å extends for a length of at least 2 Å, and especially at least 50 Å.

The membrane of the present invention has a thickness of from 1 μm to 5 mm, and preferably has a thickness of from 5 μm to 1 mm. The shape of the membrane is not particularly limited, and it may take the form of a flat membrane, pipe, hollow fiber or the like. A preferred shape, however, is one which can provide the largest membrane area per unit volume and permit a reduction in membrane thickness, such as a hollow fiber.

When producing the above inorganic porous membrane from a membrane of sodium borosilicate glass having a composition which permits phase separation, a glass having a composition of 60 to 80 wt. % of $SiO_2$, 15 to 35 wt. % of $B_2O_3$, and 3.5 to 12 wt. % of $Na_2O$ is formed into any desired shape, such as a hollow fiber. The membrane is heated at conventional heat-treatment temperature and time, for example, 480° to 600° C. and 0.25 to 300 hours to effect phase separation, and the membrane is made porous by leaching the soft phase in a high-temperature, i.e., 60° to 100° C., acid solution. The pore size becomes larger the higher the heat-treatment temperature, the longer the heat-treatment time, and the higher the content of $B_2O_3$ and $Na_2O$ components. Accordingly, in order to obtain a membrane having a small pore size, the heat-treatment temperature is lowered and the heat-treatment time is shortened. For example, when a glass having a composition of 65 wt. % of $SiO_2$, 30 wt. % of $B_2O_3$, and 5 wt. % of $Na_2O$ is subjected to the phase separation treatment at 500° C., the phase separation treatment is carried out for up to 8 hours in order to control the pore radius to 20 Å or less. In some cases, the membrane is subjected to plasma-etching treatment in an atmosphere containing a fluorine-containing compound gas after the phase separation treatment and before or after the acid leaching treatment of the soft phase, whereby the layer which is hard to phase-separate on the surface of the membrane can be removed as described in our U.S. patent application Ser. No. 528,789, filed on 9/2/83, now U.S. Pat. No. 4,521,236. The above-mentioned plasma-etching treatment refers to a treatment for corroding and removing the surface of glass by atomic fluorine generated by irradiation with high-density energy. The preferable fluorine-containing gas includes $CF_4$ gas, alone or in admixture with oxygen.

When the sodium borosilicate glass membrane is in the form of a hollow fiber, the heat-treatment for phase separation can be dispensed with since the membrane has been exposed to the temperature range of phase separation for a short time, usually one second or shorter, during its spinning step. It is also possible to contract the micropores by heating the glass membrane to a temperature of about 500° to 800° C. for about 10 minutes to several hours after it is made porous.

The surface of the separation membrane which is opposite the surface in contact with a condensable gas-containing mixture is depressurized or brought into contact with a gas having a concentration of the condensable gas lower than that of the condensable gas-containing mixture, such as dry nitrogen gas or dry air, to establish a difference in the concentration of the condensable gas between the surfaces of the membrane and to produce a driving force for permeation.

FIG. 1 is an example of a separation apparatus provided with a hydrophilic inorganic porous membrane in the form of a hollow fiber. The water vapor separation apparatus of FIG. 1 comprises a container 11 in which a bundle of a plurality of porous hollow fibers 10 is placed. Both ends of the container are sealed with sealing members 12A and 12B. Each hollow fiber 10 has its ends kept open and is sealed within the container 11 by sealing members 12A and 12B. A water vapor-containing gas mixture is compressed by a pump to a pressure of 0.8 to 0.1 kg/cm² and introduced into the hollow fiber 10 through its opening 13A. Then, the water vapor permeates the hollow fiber 10 in the thickness direction and the resultant gas is discharged from the other opening 13B at atmospheric pressure. The humidity and flow rate of this gas are measured by a hygrometer and a flowmeter, respectively. The spacing 16 is defined by the hollow fibers 10 and the container 11 is evacuated to about 4 to 150 mmHg by suction of gas through a suction port 14 by a vacuum pump. In some cases, a purging gas is supplied from a needle valve 15. To conduct separation of water vapor by using a porous membrane, it is sufficient that a difference in the partial pressure of water vapor, which serves as a driving force, is established between the surfaces of the membrane and, therefore, the apparatus of the present invention should not be limited to the above-mentioned structure or type.

Description will now be made of a general process for producing a hollow fiber-form porous glass which can be suitably used in the present invention.

Production of Hollow Fiber-form Porous Glass

A glass material, preferably having a composition of 65 wt. % of $SiO_2$, 30 wt. % of $B_2O_3$, and 5 wt. % of $Na_2O$, prepared by uniformly melting $SiO_2$, $B_2O_3$ and $Na_2O$ and thereafter grinding the solid, is placed in a platinum crucible and heated to about 1100° C. The mixture in a molten state is spun into a hollow fiber at a spinning speed of 20 to 75 m/min by blowing air at a pressure slightly higher than atmospheric pressure into a nozzle, and the fiber is wound up around a drum of a diameter of 30 cm. The spun hollow fiber-form glass thus formed has a diameter of 250 μm and a wall thickness of 15 μm. The spun hollow fiber-form glass is cut, if necessary, to a length of about 20 cm. About 1000 cut fibers are placed in a Pyrex glass tube having an outside diameter of 20 mm, an inside diameter of 18 mm and a length of 30 cm. This glass tube is then placed in an electric furnace maintained at 500° C. and held therein for a given length of time to effect phase separation. This hollow fiber-form glass is cooled to room temperature, placed in a 1N-aqueous hydrochloric acid solution, heated to 98° C. and maintained therein at this temperature for 2 hours to effect acid extraction of the soft phase. The treated glass is washed with distilled water, and held for 6 hours in distilled water heated to 98° C. while the water is replaced several times to remove unleached components. The resulting hollow fiber is withdrawn from the distilled water and air-dried to obtain a hollow fiber-form porous glass. If required, the glass is subjected to plasma-etching treatment after phase separation or air drying.

DESCRIPTION OF THE PREFERRED EMBODIMENTS

The present invention will now be described in more detail with reference to the following examples. These examples are merely illustrative of the present invention and are not intended to be limiting.

EXAMPLE 1

Figure 3:
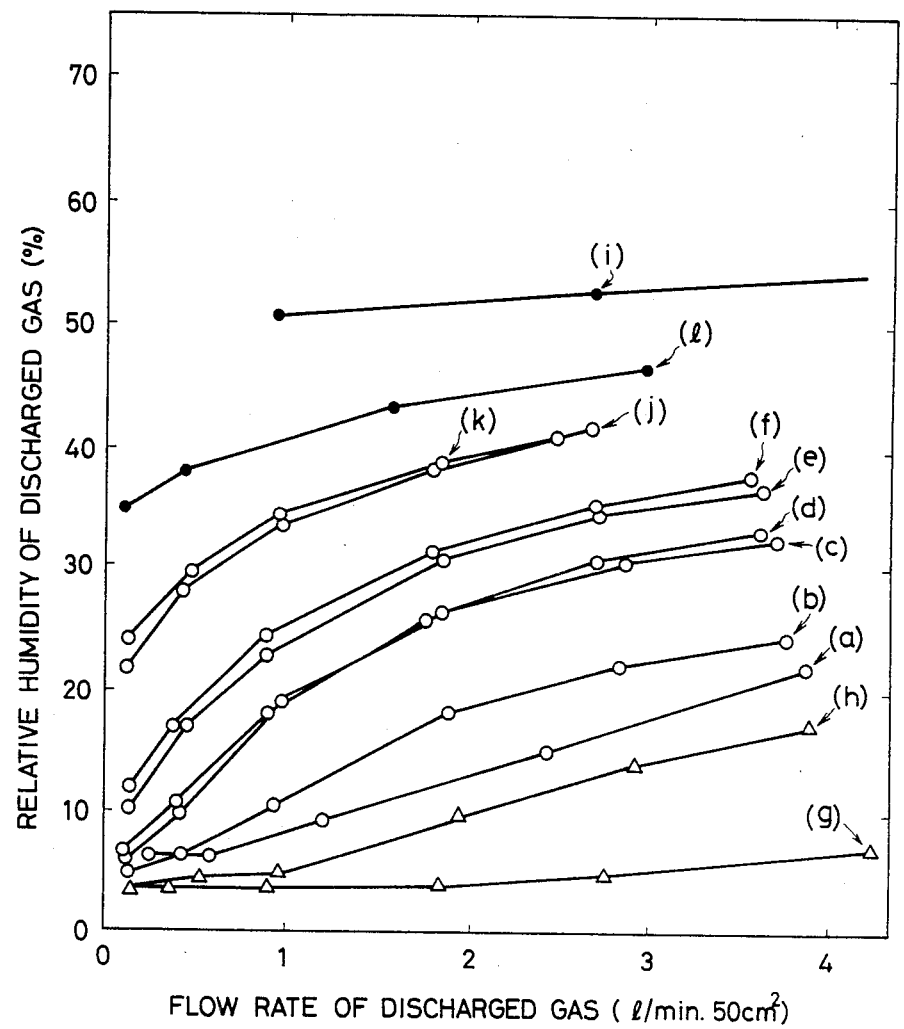
FIG. 3 is a graph depicting the relationship between the flow rate of discharged gas and its relative humidity (dehumidification rate).
Figure 4:
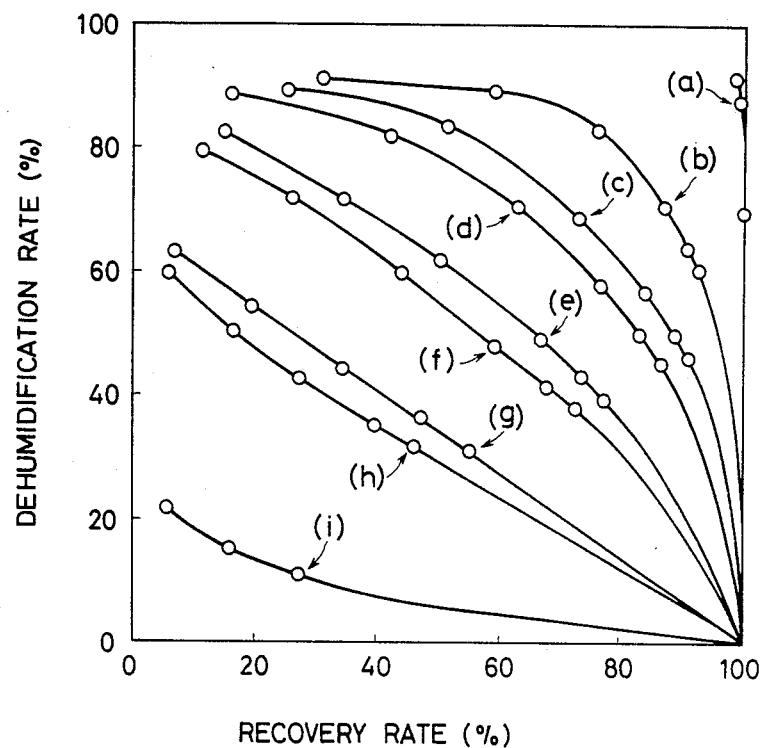
FIG. 4 is a graph showing the recovery rate and dehumidification rate.
Figure 5:
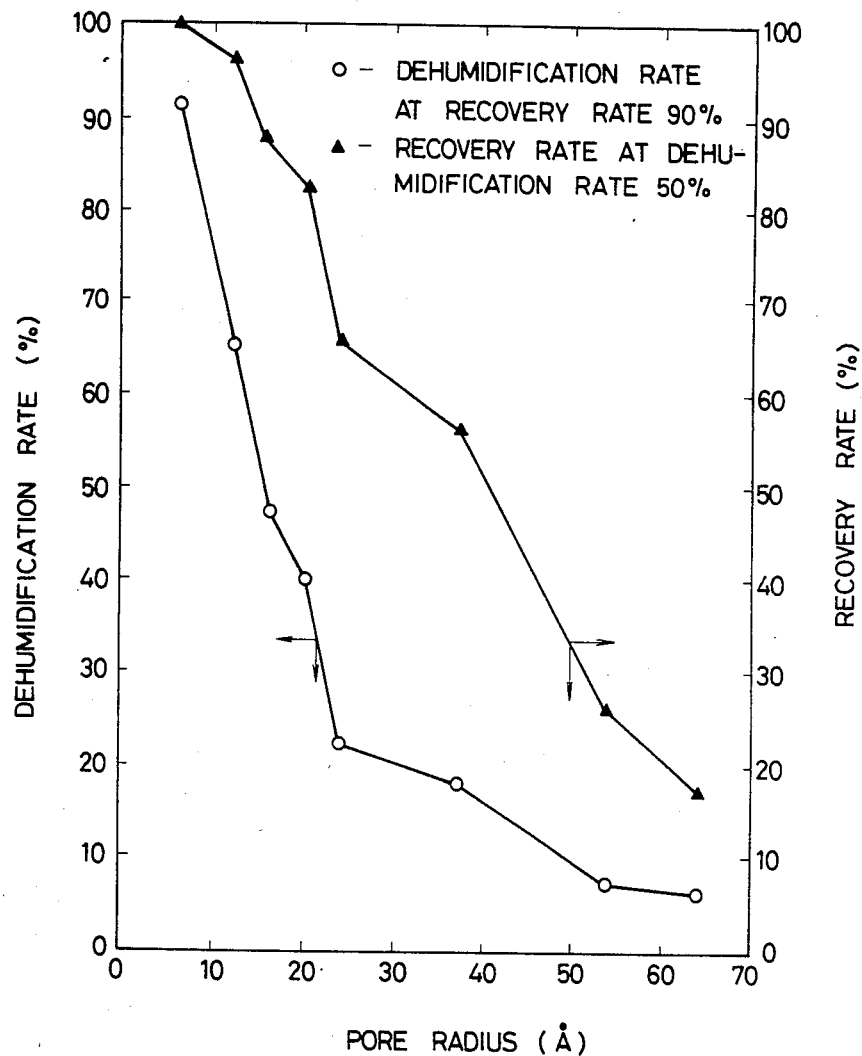
FIG. 5 is a graph showing the relationship between pore radius and dehumidification rate.

About 50 pieces of hollow fiber-form porous glass, each having a pore radius of about 6 Å, as determined by the nitrogen adsorption method, were assembled to constitute an apparatus as shown in FIG. 1. The effective membrane area in this case was 50 cm$^2$. The water vapor separation characteristics of this porous membrane were determined under the following conditions. Air at a temperature of 27° C. and a relative humidity of 72% was used as a water vapor-containing gas mixture. Air at a temperature of 27° C. and a relative humidity of 72% was supplied as a purging gas through a needle valve and passed through the effluent side at a rate of about 500 cc/min and at the same time the pressure on the effluent side was reduced to 27 mmHg. FIG. 3 shows the relationship between the flow rate of the gas discharged from an opening 13B and its relative humidity, and Table 1 shows the water vapor separation characteristics obtained from these values. FIG. 4 shows the relationship between the recovery rate of a feed gas other than water vapor and its dehumidification rate, and FIG. 5 shows the relationship between the pore radius and the dehumidification rate and between the pore radius and the recovery rate.

EXAMPLES 2 THROUGH 6

In the same manner as in Example 1, water vapor separation characteristics were measured on pieces of hollow fiber-form porous glass each having pore radii of 12, 16, 20, 24, and 37 Å, respectively, for Examples 2, 3, 4, 5, and 6. The measurement was made under the following conditions. Air at a temperature of 28° C. and a relative humidity of 60% was used as a water vapor-containing gas mixture. No purging gas was passed through the effluent side and the pressures on the effluent side were reduced to 16, 19, 27, 43, and 54 mmHg, respectively, for Examples 2, 3, 4, 5, and 6. FIG. 3 shows the relationship between the flow rate of the discharged gas and its relative humidity, and Table 1 shows the water vapor separation characteristics obtained from these values. FIG. 4 shows the relationship between the recovery rate of a feed gas other than water vapor and its dehumidification rate, and FIG. 5 shows the relationships between the pore radius and the dehumidification rate and between the pore radius and the recovery rate.

EXAMPLE 7

Water vapor separation characteristics were measured in the same manner as in Example 1 except that an anisotropic hollow fiber-form porous glass having a layer with a pore radius of about 6 Å which extended from the external surface of the hollow fiber to a depth of about 1000 Å and a remaining portion with a pore radius of 12 Å was used, and that air at a temperature of 27° C. and a relative humidity of 60% was used as a water vapor-containing gas mixture. No purging gas was passed through the effluent side, and the pressure on the effluent side was reduced to 8 mmHg. FIG. 3 shows the relationship between the flow rate of the discharged gas and its relative humidity, and Table 1 shows the water vapor separation characteristics obtained from these values. The water vapor which permeated the porous membrane under conditions in which air at a temperature of 27° C. and a relative humidity of 72% was blown against the external side of the hollow fiber and the inside was depressurized, was trapped with phosphorus pentoxide. The water vapor permeation rate was determined from its weight change, and the quantity of oxygen which permeated under these conditions was determined by gas chromatography to determine the oxygen permeation rate. The water vapor permeation rate was $3.0 \times 10^{-5}$ g/cm$^2$.sec.cmHg, the oxygen permeation rate was $3.7 \times 10^{-7}$ cm$^3$ (STP)/cm$^2$.sec.cmHg, and the water vapor/oxygen separation ratio (a value after correction to the gas state) was $1 \times 10^5$.

EXAMPLE 8

Water vapor separation characteristics were measured in the same manner as in Example 1 except that an anisotropic hollow fiber-form porous glass having a layer with a pore radius of 6 Å, which extended from the external surface of the hollow fiber to a depth of about 1000 Å, and a remaining portion with a pore radius of about 24 Å was used, that air at a temperature of 27° C. and a relative humidity of 63% was used, and that the effluent side was depressurized to 5 mmHg without passing any purging gas. FIG. 3 shows the relationship between the flow rate of the discharged gas and its relative humidity, and Table 1 shows the water vapor separation characteristics obtained from these values.

EXAMPLE 9

A module for the water vapor separation apparatus as shown in FIG. 1 was prepared in the same manner as in Example 1 except that the hollow fiber-form porous glass of Example 7 was used and that the length of the hollow fiber was 1.3 cm and the effective membrane area was 5 cm$^2$. The water vapor separation characteristics were measured, by using air at a temperature of 27° C. and a relative humidity of 65% as a water vapor-containing gas mixture and under the conditions of the discharged gas flow rate of 4.0 l/min.5 cm$^2$ and 1.0 l/min.5 cm$^2$, respectively. The results are shown in Table 2.

EXAMPLE 10

The water vapor separation characteristics of the water vapor separation apparatus having an effective membrane area of 50 cm$^2$ obtained in Example 7 were measured by passing nitrogen gas having 0% humidity through the outside (effluent side) at a flow rate of 10 l/min. This measurement was conducted by using air at a temperature of 27° C. and a relative humidity of 60% as a water vapor-containing gas mixture. It was found that its relative humidity was 19% and its dehumidification rate was 69% when the flow rate of the effluent gas was 2.0 l/min.50 cm$^2$, and that its relative humidity was 27% and its dehumidification rate was 56% when the flow rate was 4.0 l/min.50 cm$^2$. The dehumidification rate was thus lower than that of Example 7. When the flow rate was 2.0 l/min.50 cm$^2$, the relative humidity of the nitrogen gas on the effluent side was 14%, and when the flow rate was 4.0 l/min.50 cm$^2$, it increased to 22%.

EXAMPLE 11

The water vapor separation apparatus of Example 7 was operated by using acetic acid-containing air at a temperature of 27° C., an acetic acid concentration of 1700 ppm and a relative humidity of 65% under conditions including an effluent flow rate of 1 l/min.50 cm$^2$ and an effluent side pressure of 3 mmHg. After the operation reached a steady state, the relative humidity of the effluent gas was measured by a hygrometer. The effluent gas was bubbled into distilled water to trap the acetic acid and the acetic acid concentration of the discharged gas was determined from the pH change of the aqueous solution. Table 3 shows the results.

EXAMPLE 12

The acetic acid concentration of a discharged gas was determined in the same manner as in Example 11 except that acetic acid-containing nitrogen at a temperature of 27° C., an acetic acid concentration of 1700 ppm and a relative humidity of 0% was used as a condensable gas-containing gas mixture. Table 3 shows the results.

EXAMPLE 13

The water vapor separation apparatus of Example 7 was operated by using toluene-containing air at a temperature of 27° C., a toluene concentration of 1080 ppm and a relative humidity of 60% as a condensable gas-containing gas mixture under conditions including a discharged gas flow rate of 1.3 l/min.50 cm$^2$ and an effluent side pressure of 3 mmHg. After the operation reached a steady state, the relative humidity of the effluent gas was measured by a hygrometer. The effluent gas was bubbled into ethanol to trap the toluene and the toluene concentration of the effluent gas was determined from the change in the absorbancy at a wavelength of 265 mm of the solution. Table 3 shows the results.

EXAMPLE 14

The toluene concentration of an effluent gas was determined in the same manner as in Example 13 except that toluene-containing nitrogen having a temperature of 27° C., a toluene concentration of 1080 ppm and a relative humidity of 0% was used as a condensable gas-containing gas mixture. Table 3 shows the results.

EXAMPLE 15

The relative humidity and n-propylamine concentration of an effluent gas were measured in the same manner as in Example 11 except that n-propylamine-containing air at a temperature of 27° C., an n-propylamine concentration of 1500 ppm and a relative humidity of 69% was used as a condensable gas-containing gas mixture, and that the measurement was conducted at an effluent flow rate of 2 l/min.50 cm$^2$. Table 3 shows the results.

EXAMPLE 16

The permeability characteristics of the hollow fiber-form porous glass membrane obtained in Example 7 were determined at various humidities by using a gas mixture having a composition of 10% CO$_2$ and 90% N$_2$. At a humidity of 100%, the CO$_2$ permeation rate was $1.0 \times 10^{-6}$ cm$^3$ (STP)/cm$^2$.sec.cmHg, and the CO$_2$/N$_2$ separation ratio was 42. At a humidity of 0%, the CO$_2$ permeation rate was $1.3 \times 10^{-4}$ and the separation ratio was 4.2. This suggests that the above-described hollow fiber-form glass membrane can separate CO$_2$.

COMPARATIVE EXAMPLE 1

Hollow fiber-form porous polypropylene having an outside diameter of 250 μm and an inside diameter of 200 μm with a pore radius of 200 to 2000 Å, cut to a length of about 13 cm was used as a porous membrane. 50 cut fibers were modularized into the water vapor separation apparatus as shown in FIG. 1 to provide an effective membrane area of 50 cm$^2$, and its water vapor separation characteristics were determined under an effluent side pressure of 100 mmHg. The results are shown in FIGS. 3 and 4 and in Table 1.

COMPARATIVE EXAMPLES 2 AND 3

The water vapor separation characteristics of pieces of hollow fiber-form porous glass each having pore radii of 53 and 63 Å, respectively (Comparative Examples 2 and 3), were determined in the same manner as in Example 1. The measurement was conducted by using air at a temperature of 28° C. and a relative humidity of 60% as a water vapor-containing gas mixture, and reducing the pressure on the effluent side to 80 and 98 mmHg, respectively, without passing purging gas through the effluent side. The results are shown in FIGS. 3, 4 and 5 and in Table 1.

COMPARATIVE EXAMPLE 4

100 pieces of the hollow fiber-form porous glass obtained in Example 5 were placed in a solution of diethoxydimethylsilane (1.0 g) and p-toluenesulfonic acid (0.5 g) in toluene (9.0 g). The solution was heated to a temperature of 80° C. and held at that temperature for 2 hours. The toluene solution was cooled to room temperature and the fiber was withdrawn form the solution and washed with ethanol. This hollow fiber was rendered hydrophobic by heating it at 120° C. for 2 hours.

This hollow fiber was modularized into the water vapor separation apparatus as shown in FIG. 1, and its water vapor separation characteristics were determined under conditions including an effluent side pressure of 20 mmHg and a relative humidity of the water vapor-containing air of 50%. The results are shown in FIG. 3 and Table 1. These results show that the water vapor separation characteristics in this Comparative Example were markedly poor as compared with those in Example 5.

TABLE 1

| Sample | pore radius (Å) | minimum attainable humidity (%) | flow rate (l/min · 50 cm²) | relative humidity (%) | dehumidification rate[a] (%) | recovery rate[b] (%) | water vapor permeation rate[c] (g/cm² · sec · cmHg) | separation ratio[c] PH₂O/Pair[d] |
|---|---|---|---|---|---|---|---|---|
| Ex. 1 | 6 | 4.4 | 1.2 | 9.5 | 86.8 | 99.5 | $1.4 \times 10^{-5}$ | 900 |
|   |   |   | 3.9 | 22 | 69.4 | 99.9 |   |   |
| Ex. 2 | 12 | 5.4 | 0.95 | 10.7 | 82.2 | 75.5 | $1.1 \times 10^{-5}$ | 14 |
|   |   |   | 3.8 | 24.3 | 59.5 | 92.5 |   |   |
| Ex. 3 | 16 | 6.4 | 0.97 | 19.2 | 68.0 | 72.6 | $8.1 \times 10^{-6}$ | 8.0 |
|   |   |   | 3.7 | 32.5 | 45.8 | 90.9 |   |   |
| Ex. 4 | 20 | 7.0 | 0.91 | 18.0 | 70.0 | 62.1 | $8.8 \times 10^{-6}$ | 5.4 |
|   |   |   | 3.6 | 33.0 | 45.0 | 86.2 |   |   |
| Ex. 5 | 24 | 10.5 | 0.91 | 23.1 | 61.5 | 50.0 | $9.3 \times 10^{-6}$ | 3.0 |
|   |   |   | 3.6 | 36.8 | 38.7 | 76.9 |   |   |
| Ex. 6 | 37 | 12.1 | 0.90 | 24.5 | 59.2 | 43.5 | $1.1 \times 10^{-5}$ | 2.5 |
|   |   |   | 3.6 | 37.5 | 37.5 | 72.1 |   |   |
| Ex. 7 | 6–12 | 4.0 | 0.92 | 4.0 | 93.8 | 93.0 | $2.5 \times 10^{-5}$ | 340 |
|   |   |   | 4.3 | 7.0 | 89.0 | 99.3 |   |   |
| Ex. 8 | 6–24 | 4.0 | 0.98 | 5.2 | 91.7 | 98.6 | $1.8 \times 10^{-5}$ | 540 |
|   |   |   | 3.9 | 17.0 | 73.0 | 99.7 |   |   |
| Comp. Ex. 1 | 200 × 2000 | 53 | 2.7 | 52.5 | 15 | 15.4 | $4.1 \times 10^{-5}$ | >1.1 |
|   |   |   | 5.6 | 55.0 | 11 | 26.9 |   |   |
| Comp. Ex. 2 | 53 | 22.0 | 0.99 | 33.5 | 44.1 | 33.3 | $1.1 \times 10^{-5}$ | 1.7 |
|   |   |   | 2.7 | 41.8 | 30.3 | 54.5 |   |   |
| Comp. Ex. 3 | 63 | 24.4 | 0.97 | 34.5 | 42.5 | 26.6 | $1.4 \times 10^{-5}$ | 1.6 |
|   |   |   | 2.5 | 40.9 | 31.8 | 45.8 |   |   |
| Comp. Ex. 4 | — | 35.0 | 0.48 | 38.0 | 24 | 73.6 | $5.9 \times 10^{-7}$ | 1.4 |
|   |   |   | 3.0 | 46.0 | 8 | 94.6 |   |   |

[a]dehumidification rate = $\frac{\text{Relative humidity of feed gas} - \text{relative humidity of effluent gas}}{\text{relative humidity of feed gas}} \times 100$

[b]recovery rate = $\frac{\text{flow rate of effluent gas}}{\text{flow rate of effluent gas} + \text{quantity of permeating gas}} \times 100 = \frac{\text{quantity of effluent gas}}{\text{quantity of feed gas}} \times 100$

[c]determined from the relative humidity and the recovery rate at the highest flow rate. This value was underestimated as compared with the actual value because the partial pressure of water vapor on the feed side was an average of the values at the inlet and exit.

[d]Water vapor/air separation ratio was determined from the permeation rates corrected to the gas state.

TABLE 2

Water vapor separation characteristics

| Sample | Feed side[a] pressure (kg/cm²) | Effluent side pressure (mmHg) | flow rate (l/min · 5 cm²) | relative humidity (%) | dehumidification rate (%) | Recovery rate (%) |
|---|---|---|---|---|---|---|
| EX. 9 | 0.2 | 4 | 4.0 | 41.0 | 37 | 99.9 |
|   | 0.05 | 5 | 1.0 | 25.8 | 60 | 99.7 |

[a]a pressure measured when the relative humidity of the feed air is 65% and atmospheric pressure is considered as 0 kg/cm².

TABLE 3

Condensable gas separation characteristics

| Example | Relative humidity of effluent gas (%) | removal rate (%) | condensable gas concentration of effluent gas (ppm) | Deodorization rate[d] (%) |
|---|---|---|---|---|
| 11 | 17 | 74 | 50[a] | 97 |
| 12 | — | — | 34[a] | 98 |
| 13 | 12 | 80 | 650[b] | 40 |
| 14 | — | — | 570[b] | 37 |
| 15 | 52 | 25 | 1350[c] | 10 |

[a]acetic acid concentration,
[b]toluene concentration,
[c]n-propylamine concentration.
Deodorization rate was 100% in the initial stage of measurement only in this example.

[d] $\left(1 - \frac{\text{condensable gas concentration of feed gas}}{\text{condensable gas concentration of effluent gas}}\right) \times 100$ FIG. 3, which concerns dehumidification capacity, clearly shows that all of the hollow glass fibers in the Examples and Comparative Examples except the hydrophobicity-imparted fiber of Comparative Example 4 permit dehumidification to a relative humidity of 30% or below. On the other hand, FIG. 3 and Table 1 show that the hydrophilic hollow fiber-form porous polypropylene (Comparative Example 1) has substantially no dehumidification capacity. Further, the hydrophobicity-imparted porous glass (Comparative Example 4) shows a markedly lowered dehydration capacity as compared with that in Example 5. It is understood, therefore, that the porous membrane should be hydrophilic when the condensable gas is water vapor.

In this way, it becomes possible to perform dehumidification to a relative humidity of 30% or below and at a dehumidification rate of above 50% by using the hydrophilic hollow fiber-form porous glass of the present invention. However, FIG. 4 which shows the relationship between the recovery rate and the dehumidification rate, and FIG. 5, which shows the relationships between the pore radius and the dehumidification rate and between the pore radius and the recovery rate show that a hollow fiber-form porous glass having a pore radius of 50 Å or more (Comparative Examples 2 and 3) shows a very low recovery rate, for example 30% or below when the dehumidification rate is 50%. When the recovery rate is low as in this case, a large quantity of gas flows into the side of a vacuum pump to reduce the degree of the vacuum. Therefore, the capacity of the pump must be increased, which lowers the energy efficiency of the system. Further, when the dehumidification of hydrogen gas or the like is considered, the gas is discarded in vain, so that the economic loss is large. Therefore, the pore radius should be no more than 50 Å. In addition, there is a tendency that, as the pore radius becomes smaller, performances including a minimum attainable humidity, dehumidification rate, and recovery rate are improved. It is preferred that the pore radius is at most 20 Å, because then the recovery rate at a dehumidification rate of 50% is as high as greater than 80% and the dehumidification rate at a recovery rate of 90% is also improved as shown in FIG. 5, and the minimum attainable humidity is 10% or less as shown in Table 1. Especially, the hollow fiber-form porous glass having the smallest pore radius of 6 Å as in Example 1 has excellent performance including a dehumidification rate of 69%, and a recovery rate of 99.9% even when a large quantity of gas (3.9 l/min) is passed, even though it has a membrane area of only 50 cm$^2$.

Next, the form of the membrane will be considered. The anisotropic fiber-form porous glass having a layer with a pore radius of 6 Å on the external surface and the remaining portion having a larger pore radius (Examples 7 and 8) have a dehumidification capacity higher than that of Example 1, as FIG. 3 clearly shows. This is interpreted as follows. The layer of a pore radius of 6 Å having the best selective permeability to water vapor is thin, so that its permeation rate becomes high. Therefore, as the form of the membrane, an anisotropic membrane having a layer of a pore radius of up to 20 Å and the remaining portion having a larger pore radius may be used in addition to a membrane having uniform micropores over the entire membrane.

Next, the water vapor permeation rate and water vapor/air separation ratio of a porous membrane, which are water vapor permeation characteristics, will be considered. The hollow fiber-form porous glass of Example 1 has a separation ratio of 900, and a water vapor permeation rate of $1.4 \times 10^{-5}$ g/cm$^2$.sec.cmHg, which are very high values. Further, there is a tendency that the separation ratio decreases as the pore radius increases. However, it is thought that both of the values are considerably underestimated for the following two reasons. They are determined from the dehumidification capacity of a module, so that the degree of the vacuum on the effluent side is poor, and the difference in the partial pressure of water vapor between the surfaces of the membrane decreases toward the exit, so that the effective membrane area where permeation of water vapor actually takes place is thought to be reduced severalfold. The partial pressure on the feed side is an average of the values at the inlet and the exit, so that it is overestimated as compared with the actual value. When the water vapor permeation rate and water vapor/air separation ratio of the hollow fiber-form porous glass of Example 7 were determined under conditions including a humidity of 72% and a temperature of 27° C., it was found that the membrane had such high performance that it had a water vapor permeation rate of $3.0 \times 10^{-5}$ g/cm$^2$.sec.cmHg, and a separation ratio of $1 \times 10^5$. In Example 9, the water vapor separation characteristics of the module having a membrane area of only 5 cm$^2$ was shown, but this membrane showed excellent dehumidification capacity (a dehumidification rate of 60% and a recovery rate of 99.7%) even when air was passed at a rate of 1 l/min. This is because the entire area of the membrane works efficiently.

When comparison is made between the two methods for establishing a difference in the partial pressure of water vapor between the surfaces of a membrane, that is, comparison is made between Example 10 wherein a method involving passing nitrogen gas is adopted and Example 7 wherein a method of pressure reduction is adopted, the former method can perform dehumidification but has a dehumidification rate lower than that of the latter, even though as much as 10 l/min of nitrogen is passed. This suggests that dehumidification is possible even when a method in which moisture is exchanged between dry gas and a condensable gas-containing gas mixture is adopted, but its efficiency is lower than that of the pressure reduction method.

Although the above description refers to the separation of water vapor, the condensable gas separation apparatus of this invention can be used to separate other condensable gases.

Examples 11 through 15 contain the results of investigations on polar molecules such as carboxylic acids or amines and nonpolar molecules such as hydrocarbons, which are typical examples of organic gases. Examples 11 and 12 wherein the investigation was made by using acetic acid as a carboxylic acid showed a deodorization rate of as high as about 97%. On the other hand, Example 15 wherein the investigation was made by using n-propylamine as an amine showed a deodorization rate of as low as 10%, though separation was possible. This amine showed a deodorization rate of 100% in the initial stage of the measurement. These results are interpreted as follows. Because of its acidity, the silanol group on the surface of the porous glass shows an ion exchange action against a basic gas such as an amine and binds strongly with it. Accordingly, the separation of polar organic molecules is possible, though its extent varies.

Furthermore, investigation was made with toluene as a nonpolar molecule. Both Examples 13 and 14 show a deodorization rate of about 40%. This fact shows that the separation of organic gas is possible regardless of its polarity. Example 16 concerns the separation of $CO_2$ as an organic gas, which shows selective permeability higher than that of air. Therefore, this invention is applicable also to the separation of polar inorganic gas such as $CO_2$.

As described above in detail, a hydrophilic inorganic porous membrane having a controlled pore radius of up to 50 Å, and preferably up to 20 Å shows very excellent permeability to water vapor because of phenomena such as capillary condensation and the like. It is therefore possible to provide a water separation apparatus which can separate, by permeation, water vapor almost exclusively, and is excellent in minimum attainable humidity, flow rate, dehumidification rate, and recovery rate by using the membrane. In addition, because this water separation apparatus can be operated by a pressure reduction method, it can be of an energy-saving type and can separate water vapor almost completely. Further, its stability is good because the structure of the membrane used is simple.

Furthermore, it has an advantage in that its size can be reduced because it is of a continuous type, drying to a low humidity is possible, and the permeation rate is high. Because of these advantages, the apparatus can be used in a variety of applications. For example, it may be used as a hydrogen gas drying apparatus which is used when hydrogen gas produced by hydrolysis of water is used in a hydrogen flame gas chromatographic apparatus. Because of the possibility of a reduction in size, it can be applied to a dehumidifier for a car cabin. A desiccator containing a common drying agent cannot perform drying to a low humidity and, when this desiccator is opened frequently, the rate of drying is lowered markedly and its efficiency is lowered. The present apparatus is applicable to such a frequently opened desiccator because it is possible to pass low-humidity gas and to replace the gas in the desiccator with this dry gas within a short time.

Moreover, the condensable gas separation apparatus of this invention is applicable to the separation of condensable gases such as carbon dioxide, amines, carboxylic acids, alcohols, hydrocarbons, and aldehydes, as well as to water vapor.

What is claimed is:

1. An apparatus for separating a condensable gas by contacting a first surface of a membrane with a condensable gas-containing gas mixture and selectively passing said condensable gas therethrough, said apparatus comprising a hollow fiber porous glass membrane having been prepared from sodium borosilicate glass or potassium borosilicate glass, both having compositions that upon heat-treatment separate into a soft phase which leaches in high-temperature acid solution and a hard phase which does not leach in said acid solution, said soft phase having been leached with a high temperature acid solution, and said membrane being anisotropic and having a layer of a predetermined depth extending from one surface of said hollow fiber to a remaining portion of said membrane, said layer having a multiplicity of micropores with a pore radius of up to 20 Å communicating in the thickness direction of said hollow fiber, the pore radius of the micropores in said layer being less than a pore radius of the micropores in said remaining portion of said membrane.

2. The apparatus of claim 1, wherein said porous glass membrane is hydrophilic.

3. The apparatus of claim 1, wherein said condensable gas is an inorganic substance.

4. The apparatus of claim 3 wherein said inorganic substance is water vapor.

5. The apparatus of claim 1, wherein said condensable gas is an organic substance.

6. The apparatus of claim 1, wherein said porous glass membrane is formed of glass plasma-etched in an atmosphere containing a fluorine-containing compound.

7. The apparatus of claim 1, wherein the pore radius of the micropores in said remaining portion is at least 12 Å.

8. The apparatus of claim 1, wherein said layer is extended to a depth of up to about 1000 Å and the pore radius of the micropores in said layer is 6 Å.

9. A membrane for separating condensable gas, comprising a hollow fiber porous glass membrane having been prepared from sodium borosilicate glass or potassium borosilicate glass, both having compositions that upon heat-treatment separate into a soft phase which leaches in a high-temperature acid solution and a hard phase which does not leach in said acid solution, said soft phase having been leached with a high-temperature acid solution, and said membrane being anisotropic and having a layer of a predetermined depth extending from one surface of said hollow fiber to a remaining portion of said membrane, said layer having a multiplicity of micropores with a pore radius of up to 20 Å communicating in the thickness direction of said hollow fiber, the pore radius of the micropores in said layer being less than a pore of the micropores in said remaining portion of said membrane.

10. The membrane of claim 9, wherein said porous glass membrane is hydrophilic.

11. The membrane of claim 9, wherein the pore radius of the micropores in said remaining portion is at least 12 Å.

12. The membrane of claim 9, wherein said layer is extended to a depth of up to about 1000 Å and the pore radius of the micropores in said layer is 6 Å.

13. A process for separating condensable gas comprising:
    (a) contacting a first surface of a hollow fiber porous glass membrane for separating condensable gas with a condensable gas-containing gas mixture, said membrane having been prepared from sodium borosilicate glass or potassium borosilicate glass, both having compositions that upon heat-treatment separate into a soft phase which leaches in high-temperature acid solution and a hard phase which does not leach in said acid solution, said soft phase having been leached with a high temperature acid solution, and said membrane being anisotropic and having a layer of a predetermined depth extending from one surface of said hollow fiber to a remaining portion of said membrane, said layer having a multiplicity of micropores with a pore radius of up to 20 Å communicating in the thickness direction of said hollow fiber, the pore radius of the micropores in said layer being less than a pore radius of the micropores in said remaining portion of said membrane; and
    (b) selectively passing said condensable gas through said porous glass membrane.

14. The process of claim 13, wherein said porous glass membrane is hydrophilic.

15. The process of claim 13, wherein a second surface of said membrane is contacted with a gas having a concentration of said condensable gas lower than that on said first surface to selectively pass said condensable gas through said membrane.

16. The process of claim 13, wherein the pressure on a second surface of said membrane is reduced to selectively pass said condensable gas through said membrane.

17. The process of claim 13, wherein said condensable gas is an inorganic substance.

18. The process of claim 17, wherein said inorganic substance is water vapor.

19. The process of claim 13, wherein said condensable gas is an organic substance.

* * * * *